United States Patent [19]

Simko

[11] Patent Number: 4,848,021
[45] Date of Patent: Jul. 18, 1989

[54] FISHING ROD HOLDER

[76] Inventor: Bryant Simko, 18225 Detroit Ave., Lakewood, Ohio 44107

[21] Appl. No.: 126,020

[22] Filed: Nov. 27, 1987

[51] Int. Cl.$^4$ ............................................. A01K 97/10
[52] U.S. Cl. ..................................................... 43/21.2
[58] Field of Search ................. 43/21.2; 248/520, 521, 248/528

[56] References Cited

U.S. PATENT DOCUMENTS

| | | | |
|---|---|---|---|
| 3,186,666 | 6/1965 | Williams | 248/519 |
| 3,204,899 | 9/1965 | Danielewicz | 248/528 |
| 3,327,978 | 6/1967 | Gates | 248/520 |
| 3,389,489 | 6/1968 | Burns | 43/21.2 |
| 4,014,128 | 3/1977 | Hrdlicka | 43/21.2 |
| 4,479,322 | 10/1984 | Koppel | 43/21.2 |
| 4,594,805 | 6/1986 | McClelland | 43/21.2 |

Primary Examiner—Gene P. Crosby
Attorney, Agent, or Firm—George J. Coghill

[57] ABSTRACT

A compact fishing rod holder is disclosed which is adapted for attachment to the top of a fishing tackle box. The device comprises a front rest member upon which a forward portion of a fishing rod grip sets, and a rearward collar or catch member which cooperatively engages a rearward portion of the grip to securely hold the rod in a preferred position. A rearward stop member behind the catch can advantageously be utilized to assist in positioning the grip in the holder.

12 Claims, 2 Drawing Sheets

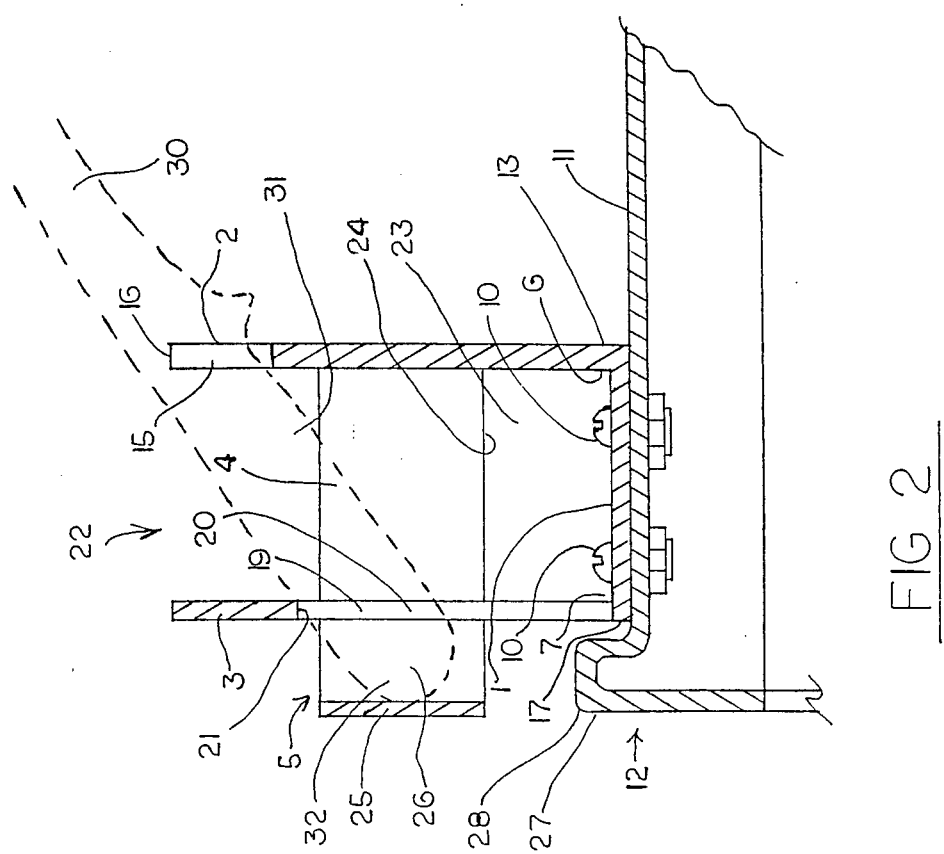

4,848,021

FISHING ROD HOLDER

BACKGROUND OF THE INVENTION

1. FIELD OF THE INVENTION

This invention relates generally to the field of fishing, and more particularly relates to a fishing rod holder which can be attached to the top of a fisherman's tackle box.

2. DESCRIPTION OF THE PRIOR ART

Most fishermen that use rods encounter a situation where they desire to free up their hands while fishing, without pulling in their line. Some merely set their rod down wherever they happen to be, for example on the pier, in the boat, in the sand, or on the ground. However, there are disadvantages to this practice. A larger fish may bite and pull the rod into the water. Also, setting the rod in the sand or on the ground may result in dirt getting into the reel mechanism or on the grip, etc.

Various attempts have been made to devise a suitable device for holding fishing rods, but in general, the result has been something rather complex, larger, and/or limited in versatility. Many were limited as to the types of rods that could be adequately held, while others were limited in the types of situations and locations where they could be used.

Some holders were designed to be free standing, but these were generally large and inconvenient. They generally had to be carried and stored separately from the other fishing gear, as some were too large to be stored in even the larger tackle boxes, and even the smaller ones took up considerable space.

Many other of the prior art holders required attachment to something each time before use. Some were designed for attachment to a pier or the like, but in many locations, there would be no suitable place for attachment. Still others were designed for non-permanent attchment to a fishing tackle box, but the difficulty with these was that the holder generally had to be removed and/or disassembled each time before use. Many had to be disassembled or removed each time the tackle box was opened for the storage or removal of other supplies. And these also had to be separately carried and/or stored, or took up space in the box when not in use.

Other designs resulted in holders that were permanently attached to a tackle box. However, these were large, generally required set up prior to use, and had moving parts that could become improperly adjusted, broken, or worn out. Many had parts that were loose and not locked into a fixed position even after set up, and these parts had a tendency to get in the way, 'hang up' on the rod, or otherwise make it difficult to get the rod into or out of the holders each time. And because these holders were generally large, they could not be used in the smaller boxes. Some had parts that protruded beyong the perimeter of the box, with the butt end of the fishing rod grip protruding still further out beyond the perimeter of the box, taking up even more room and being subject to being damaged when moving the box or positioning it. Still other were simply in the way when carrying the box.

In general then, these prior art holders that were designed for attachment to tackle boxes had many disadvantages. In addition to those mentioned above, other disadvantages include, for example, a tendency for the rod to rotate in the holder due to inadequate forces and torques being developed on the rod by the various parts to prevent the rod from rotating; small passges and openings making insertion and removal of the rod difficult, and in general the overall stability of the box/holder/rod combination was less than desired.

SUMMARY OF THE INVENTION

The present invention provides an improved fishing rod holder with various advantages over the prior art. It is small, can be made of unitary construction, and can be attached to almost all fishing tackle boxes. It is simple in construction and use, without loose or moving parts, and without set up. It can be used for virtually all common types of fishing rods with improved stability. Insertion and removal of a rod can be accomplished without difficulty and without interference of any loose or moving parts. It is designed to be permanently attached to the top of a tackle box without substantial protruding parts, and it does not require removal or disassembly in order to conveniently open the box, move it or carry it. It does not require separate storage or carrying, nor does it take up extra space in the box.

Variably, the device comprises: a forward vertical rest member having a substantial external open top recess for supporting a forward underside portion of a fishing rod grip; a rear vertical collar or catch member to engage a more rearward but upperside portion of the grip, and having a substantial open area under the catch to receive the grip. There is a top open area between the rest and the catch for insertion of the grip, and means are provided to attach the holder to the top of a fishing tackle box. The open area under the catch has a large crossectional area, substantially larger than the cross sectional dimensions of a typical fishing rod grip, which facilitates insertion and removal of the grip therein. The holder can include a stop plate displaced rearward of the collar to assist in proper positioning.

BRIEF DESCRIPTION OF THE DRAWINGS

The invention can be more readily understood by reference to the accompanying DRAWING FIGURES, in which:

FIG. 2 is a crossectional view of the device of FIG. 1 attached to a fishing tackle box.

DESCRIPTION OF THE PREFERRED EMBODIMENT

Figure 1:
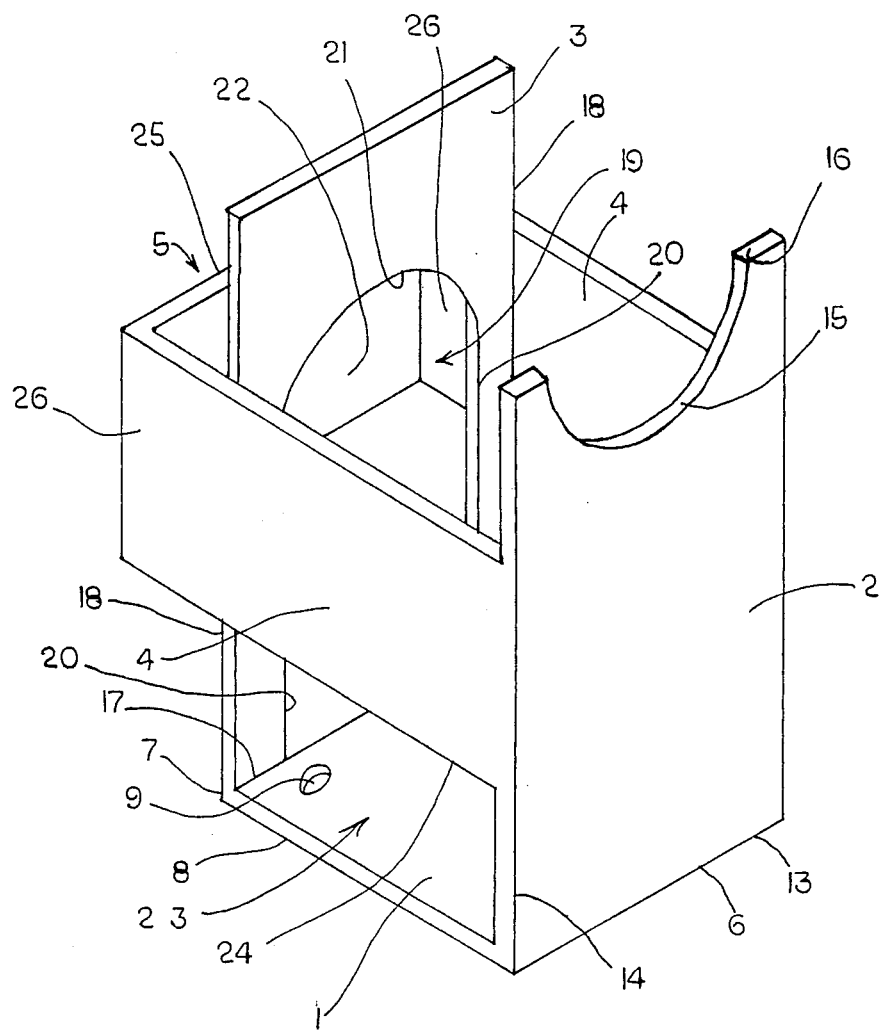
FIG. 1 is an angled external view of a preferred embodiment of the invention.

With reference to both of the Drawing FIGS. 1 and 2, the holder is adapted to engage the grip portion of a fishing rod, and in the preferred embodiment generally comprises a base 1, a front or forward rest 2 upon which a forward underside portion of a fishing rod grip sets, a rear collar or catch 3 which engages a more rearward but upperside portion of the grip, right and left side supports 4, and a rear stop member 5 to restrict the rearward positioning of the grip under the catch 3 and assist in positioning the grip in the holder.

The base 1 is generally flat and oriented parallel to the horizontal plane as depicted in FIG. 2. This base 1 can be of thin rectangular configuration with a front edge 6, a rear edge 7, and side edges 8. The dimensions are 2¼ inches front to rear and 2 inches side to side, and ⅛ inch in thickness. It has holes 9 therethrough to accept bolts 10 or the like for rigid attachment of the base 1 to the top 11 of a fishing tackle box 12, also as depicted in FIG. 2. Other attachment means could also be used.

The front rest 2 is rigidly attached at its bottom edge 13 in a fixed position to the front edge 6 of the base 1, and extends upwardly therefrom at a vertical right angle thereto as depicted. The rest 2 is generally rectangular with straight peripheral side edges 14 but having a substantial, peripheral, open top, smoothly curved, concave, semi-circular recess 15 at its top-most portion which is elevated above the top of the base 1. The height of the rest 2 at the peripheral side edges 14 is 3¾ inches, the side to side dimension is 2 inches, and the concave circular aperture 15 has a ¾ inch radius centered on the top edge 16 of the rest 2. The rest 2 and its recess 15 are aligned with and at right angles to an axis defined by the centerline of a rod when held thereon.

The catch 3 is generally rectangular with external side edges 18, and a bottom edge 17. The catch 3 is rigidly attached at its bottom edge 17 in a fixed position to the rear edge 7 of the base 1. The catch 3 is generally flat and extends upwardly from the base 1 at a vertical right angle therefrom. It is oriented parallel to the front rest 2 and aligned with and at a right angle to the same axis mentioned above that the rest 2 is aligned with. The catch 3 has a substantial elongated internal aperture 19 therein forming an open area under the catch 3. The aperture 19 has straight internal vertical edges 20 and a semi-circular top 21. The height of the catch 3 is 3¾ inches, the side to side dimension is 2 inches, the aperture is 1½ inches betweeen the straight internal vertical edges 20, and the internal semi-circular top 21 of the aperture 19 has a ¾ inch radius centered on the catch 3, 2 inches above the base 1. The catch 3 is located 2⅛ inches behind the front rest 2 creating an open area 22 at the top of the holder between the catch 3 and the rest 2 to allow insertion of the grip end of a fishing rod therethrough, and into the open area under the catch 3.

The right and left side supports 4 are generally rectangular and each is attached to one of the respective side edges 14 of the the front rest 2, and to one of the respective side edges 18 of the rear catch 3. The vertical height of the supports 4 is 1½ inches and each is elevated 1⅛ inches above the base 1, forming a gap 23 between the base 1 and the lower edge 24 of each side support 4.

The stop 5 comprises a rear plate 25, also aligned with the same above mentioned axis that the rest 2 is aligned with, and attached to the external side edges 18 of the catch 3 by side flanges 26 which extend rearwardly of the catch 3, somewhat as an extension of the side supports 4. In the preferred embodiment, the vertical dimensions of the side flanges 26 and the rear plate 25 are the same as the vertical dimensions of side supports 4. The rear plate 25 is ¾ inches rearward of the catch 3. The rear plate 25 and the side flanges 26 are elevated above the base by 1⅛ inches, forming a gap or open area thereunder.

As depicted in FIG. 2, the holder is rigidly attached through the base 1 to the top 11 of a fishing tackle box 12. The preferred positioning of the holder on the box 12 for optimum convenience and stability of the box, holder and rod combined, is with the front to rear direction of the holder aligned with the longest dimension of the box 12 and the above mentioned axis, with the rear catch 3 closest to the edge 27 of the box 12, but without the rear plate 25 protruding beyond the side edge perimeter of the box 12. As thus positioned, both the rest 2 and the catch 3 are above the top 11 of the box 12 positioned inwardly from the edge. If the box 12 is square, then the holder can be positioned adjacent any edge as may be convenient for the user, without sacrificing stability. If the top 11 of the box 12 has a ridge 28 around the outside, as many do, the elevation of the stop 5 allows the ridge 28 to pass freely thereunder thus maintaining maximum rearward positioning and hence maximum stability. With this positioning of the holder, it will function adequately even with an empty tackle box 12. It is noted however that the holder can be used in other positions on the box 12, but this will result in decreased stability.

The operation of the holder can best be appreciated with reference to FIG. 2 where the dashed lines represent a rod 30 being held by the holder. The rod is held by only the grip portion 31. The butt end 32 of the rod 30 is inserted through the top open area 22 between the front rest 2 and the catch 3, and thereafter through the aperture 19 in the catch 3 until the butt end 32 of the rod 30 contacts the stop plate 25. The rod 30 is then lowered until a bottom forward portion of the grip 31 contacts the top of the semi-circular recess 15 in the forward rest 2 and an upper rearward portion of the grip engages the underside edge of the aperture 22 in the catch 3.

Removal of the rod 30 from the holder is merely a matter of grasping the rod 30 and lifting it out.

Both insertion and removal of a rod 30 from the holder is fast and easy without the disadvantages of the large size, set up, and positioning of parts required by the holders of the prior art. In the present invention, there are no moving parts or other elements which may cause difficulty in set up, insertion or removal of the rod 30 from the holder, or by otherwise interfereing with the rod 30 during use.

All of the parts can be made integrally as one rigid unitary piece as might be accomplished with injection molding techniques, or each could be made separately and later assembled by other techniques well known in the art. The rigid unitary construction however reduces the manufacturing costs, and eliminates the possibility of moving or assembled parts becoming loose and degrading the performances of the holder.

The dimensions and relative spacial relationships of certain elements are also important to various inventive aspects the operation and convenience of this rod holder as compared to rod holders of the prior art.

The small size allows the holder to be used with a large variety of tackle boxes, only requiring a small top area for attachment, and without the necessity of removing the holder from the box or collapsing it when not in use.

The large aperture 19 in the catch 3 and recess 15 in the rest 2, results in a loose fit for virtually all rod grips, and thus allows the holder to be used for rods with a wide range of grip sizes and configurations. Moreover, the short distance between the front rest 2 and the rear catch 3 creates a large amount of pressure at the points of contact on the grip 31, and hence reduces or eliminates the tendency of the rod 30 to rotate in the holder, even with the loose fit of the recess 15 and aperture 19. It is noted that shapes other than semi-circles can be used for the recess and aperture, without impairing the operation of the device.

The stop plate 25 acts as a guide to prevent the rod 30 from being positioned too far back in the holder, since the farther back the rod 30 is positioned, the less turning moment is created on the grip 31, and the greater tendency the rod 30 has to twist in the holder. The stop 5 also prevents the butt end of the grip 31 from protruding out beyond the perimeter of the box 12 when the holder is mounted in its preferred position. However, it is noted that the holder can be used without a stop 5.

With the particular dimensions of the holder of this preferred embodiment, a typical rod will be held at approximately 30 degrees from the horizontal. Other angles may be desireable for other purposes or other rod grips, and the particular dimensions of the holder can be varied somewhat to accomodate these other angles and/or rods if desired without departing from the scope of the invention, and this will be well understood by those persons skilled in the art.

In more particular, with regard to particular dimensions and their effect on certain inventive aspects, the substantial smoothly curved recess 15 in the rest 2 is preferrably such that the rod contacts the top of the recess at substantially one underside location. The substantial open area 19 under the catch 3 is advantageously at least 1¼ inches in its smallest dimension, and preferrably elongated in its vertical direction. For certain inventive aspects of the holder, the stop 5 should be positioned to extend no more than 5 inches rearward of the rest 2, and necessarily then, the catch 3 would be less than 5 inches rearward of the rest 2.

Having described the invention, I claim:

1. A fishing rod holder for attachment to the top of a fishing tackle box comprising:
    fixed forward vertical rest means having a substantial peripheral open top recess aligned with an axis for supporting a forward underside portion of a fishing rod grip;
    vertical catch means for engaging a rearward upperside portion of a fishing rod grip, rearwardly fixed with respect to the rest means, having a substantial internal opening means thereunder aligned with said axis to receive a fishing rod grip in a preferred position, and located rearward of a top open area between the rest means and the catch means;
    means to attach the holder to the top of a fishing tackle box;
    wherein the catch means is located less than 5 inches rearward of the rest means;
    and which further comprises:
    stop means located less than 5 inches rearward of said reat means to restrict the rearward positioning of the grip under the catch means.

2. A fishing rod holder comprising:
    a fishing tackle box having a horizontal top, and side edges;
    a forward rest rigidly attached to the box and located above the top thereof, and having a substantial top open recess means thereon aligned with an axis and elevated above the top of said box;
    a catch member rigidly attached to the box above the top thereof, located less than 5 inches rearward of said rest and rearward of a top open area between the rest and the catch member, and having a substantial open area thereunder aligned with said axis; and
    stop means aligned with said axis located less than 5 inches rearward of said rest to restrict the rearward positioning of a fishing rod grip therein.

3. A fishing rod holder comprising:
    a fishing tackle box having a horizontal top, and side edges;
    a forward rest rigidly attached to the box and located above the top thereof, and having a substantial top open recess means thereon aligned with an axis and elevated above the top of said box;
    a catch member rigidly attached to the box above the top thereof, located less than 5 inches rearward of said rest and rearward of a top open area between the rest and the catch member, and having a substantial open area thereunder aligned with said axis; and
    wherein the holder has a fixed unitary construction and is rigidly attached to the top of the box.

4. The fishing rod holder of claim 3 which further comprises:
    stop means aligned with said axis located less than 5 inches rearward of said rest to restrict the rearward positioning of a fishing rod grip therein.

5. A fishing rod holder comprising:
    a fishing tackle box having a horizontal top, and side edges;
    a forward rest rigidly attached to the box and located above the top thereof, and having a substantial top open recess means thereon aligned with an axis and elevated above the top of said box;
    a catch member ridigly attached to the box above the top thereof, located less than 5 inches rearward of said rest and rearward of a top open area between the rest and the catch member, and having a substantial open area thereunder aligned with said axis, wherein the rest and the catch member are located inwardly of the edge of the box, and wherein the holder has a fixed unitary construction and is rigidly attached to the top of the box.

6. The fishing rod holder of claim 5 which further comprises:
    stop means aligned with said axis located less than 5 inches rearward of said rest to restrict the rearward positioning of a fishing rod grip therein.

7. The fishing rod holder of claim 5 wherein: the axis is aligned with the longest dimension of the box; and
    the catch is positioned closer to the edge of the box than the rest.

8. The fishing rod holder of claim 7 which further comprises:
    stop means aligned with said axis located less than 5 inches rearward of said rest to restrict the rearward positioning of a fishing rod grip therein and which is elevated above the top surface of the box to form an open gap thereunder.

9. The fishing rod holder of claim 8 wherein:
    the recess in the top of the rest comprises a smooth curve means so to contact the underside of a fishing rod grip at substantially one location; and
    the opening under the catch is at least 1.25 inches wide and 1.25 inches high.

10. A fishing rod holder for attachment to the top of a fishing tackle box comprising:
    fixed forward vertical rest having a substantial external open top recess aligned with an axis for supporting a forward underside portion of a fishing rod grip;
    a fixed vertical catch for engaging a rearward upperside portion of a fishing rod grip, located less than 5 inches rearwardly of the rest along the axis, having a substantial internal opening means thereunder aligned with said axis to receive a fishing rod grip in a preferred position, and located rearward of a top open area between the rest and the catch;
    means to attach the holder to the top of a fishing tackle box; and stop means aligned with said axis located less than 5 inches rearward of said rest to restrict the rearward positioning of a fishing rod grip therein.

11. A fishing rod holder comprising:

fixed forward vertical rest having a substantial external open top recess aligned with an axis for supporting a forward underside portion of a fishing rod grip;

a fixed vertical catch for engaging a rearward upperside portion of a fishing rod grip, located less than 5 inches rearwardly of the rest along the axis, having a substantial internal opening means thereunder aligned with said axis to receive a fishing rod grip in a preferred position, and located rearward of a top open area between the rest and the catch;

means to attach the holder to the top of a fishing tackle box;

stop means aligned with said axis located less than 5 inches rearward of said rest to restrict the rearward positioning of a fishing rod grip therein;

wherein the recess in the top of the rest comprises a smooth curve means so to contact the underside of a fishing rod grip at substantially one location; and the opening under the catch is at least 1.25 inches wide and 1.25 inches high.

12. The fishing rod holder of claim 11 wherein the stop means is elevated above the top surface of the box to form an open gap thereunder.

* * * * *